United States Patent
Hawkins et al.

(10) Patent No.: US 9,790,345 B2
(45) Date of Patent: Oct. 17, 2017

(54) ACID SUPPRESSIBLE RHEOLOGY MODIFIER STABILIZED WITH PHOSPHORIC ACID ESTER SURFACTANT

(71) Applicant: Rohm and Haas Company, Philadelphia, PA (US)

(72) Inventors: Douglas R. Hawkins, Maple Glen, PA (US); Alvin M. Maurice, Lansdale, PA (US); John J. Rabasco, Allentown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 38 days.

(21) Appl. No.: 15/041,064

(22) Filed: Feb. 11, 2016

(65) Prior Publication Data

US 2016/0237247 A1    Aug. 18, 2016

Related U.S. Application Data

(60) Provisional application No. 62/116,614, filed on Feb. 16, 2015.

(51) Int. Cl.

| C08K 5/521 | (2006.01) |
|---|---|
| C08K 5/524 | (2006.01) |
| C09D 171/02 | (2006.01) |
| C09D 7/00 | (2006.01) |
| C09D 7/12 | (2006.01) |
| C09D 7/02 | (2006.01) |
| C08K 5/52 | (2006.01) |
| C08G 59/18 | (2006.01) |
| C08L 71/02 | (2006.01) |
| C08L 75/08 | (2006.01) |

(52) U.S. Cl.
CPC ............... *C08K 5/521* (2013.01); *C09D 7/00* (2013.01)

(58) Field of Classification Search
None
See application file for complete search history.

(56) References Cited

U.S. PATENT DOCUMENTS

| 5,425,806 | A * | 6/1995 | Doolan ................ | C09D 7/002 |
|---|---|---|---|---|
| | | | | 106/193.1 |
| 7,741,402 | B2 * | 6/2010 | Bobsein ............ | C08G 18/0814 |
| | | | | 524/48 |
| 2008/0234411 | A1 * | 9/2008 | Bobsein ............ | C08G 18/0814 |
| | | | | 524/48 |
| 2010/0310483 | A1 * | 12/2010 | Klug ................... | A61K 8/042 |
| | | | | 424/59 |
| 2011/0009540 | A1 * | 1/2011 | Terrenoire ........... | C08F 220/18 |
| | | | | 524/145 |
| 2013/0237651 | A1 * | 9/2013 | Fillipo ................. | C09D 7/002 |
| | | | | 524/147 |

FOREIGN PATENT DOCUMENTS

AU    2009227048 A1    9/2009

\* cited by examiner

*Primary Examiner* — Peter A Salamon
(74) *Attorney, Agent, or Firm* — Reid S. Willis

(57) ABSTRACT

The present invention relates to a composition comprising an aqueous solution of an acid suppressible hydrophobically modified alkylene oxide polymer and a phosphoric acid ester surfactant. The composition of the present invention provides a pourable thickener with high solids content and good phase stability.

9 Claims, No Drawings

ACID SUPPRESSIBLE RHEOLOGY MODIFIER STABILIZED WITH PHOSPHORIC ACID ESTER SURFACTANT

BACKGROUND OF THE INVENTION

The present invention relates to a composition comprising an aqueous solution of an acid suppressible rheology modifier, more particularly, a hydrophobically modified alkylene oxide polymer, and a phosphoric acid ester surfactant. The composition of the present invention exhibits improved stability against phase separation.

Rheology modifiers (also known as thickeners) are advantageously combined with aqueous dispersions of film-forming polymer particles (binder) to obtain the desired degree of viscosity in coatings formulations. Thickeners of particular interest are hydrophobically modified alkylene oxide polymers, more particularly hydrophobically modified ethylene oxide urethane polymers (HEURs), which enjoy widespread commercial use.

In recent years, Bobsein et al. (U.S. Pat. No. 7,741,402 B2) described an approach for the efficient preparation of pourable HEURs with concomitant high thickener solids content, by incorporating secondary or tertiary amine or phosphine functionality into the hydrophobic portion of the HEUR, thereby causing thickener suppression under acid conditions and increased thickening efficiency at pH greater than 8. One of the drawbacks of HEURs, however, continues to be their propensity to phase separate, which is believed to result from the presence of water-insoluble small molecule byproducts formed in the preparation of the thickener. This phase separation is unsightly at best and, in extreme cases, causes a reduction in thickening efficiency. It would therefore be an advance in the art to prepare pourable HEURs with high thickener solids without attendant phase separation, while preserving the integrity of the coatings formulation.

SUMMARY OF THE INVENTION

The present invention addresses a need in the art by providing a composition comprising, based on the weight of the composition: (a) 10% to 40% by weight of a water soluble hydrophobically modified alkylene oxide polymer having a hydrophobic portion, at least 50% by weight of which comprises structural units of a conjugate acid of a secondary or a tertiary amine substituted with $C_6$-$C_{36}$-alkyl, $C_3$-$C_8$ cycloalkyl, $C_6$-$C_{20}$-aryl, or a combination thereof, which hydrophobic portion is optionally functionalized with O, OH, NH, or N—$C_1$-$C_6$-alkyl, or a combination thereof;
(b) 0.1% to 15% by weight a phosphoric acid ester or a salt thereof, wherein the phosphoric acid ester is represented by either or both of the following formulas:

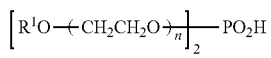

where $R^1$ is $C_6$-$C_{19}$ alkyl, $C_6$-$C_{19}$ alkylphenyl, or tristyrylphenyl; and n is 0 to 20; and
(c) 45% to 90% by weight of water; wherein the composition has a pH of less than 6.

The composition of the present invention provides a pourable thickener with high solids content and good phase stability.

DETAILED DESCRIPTION OF THE INVENTION

The present invention is a composition comprising, based on the weight of the composition: (a) 10% to 40% by weight of a water soluble hydrophobically modified alkylene oxide polymer having a hydrophobic portion, at least 50% by weight of which comprises structural units of a conjugate acid of a secondary or a tertiary amine substituted with $C_6$-$C_{36}$-alkyl, $C_3$-$C_8$ cycloalkyl, $C_6$-$C_{20}$-aryl, or a combination thereof, which hydrophobic portion is optionally functionalized with O, OH, NH, or N—$C_1$-$C_6$-alkyl, or a combination thereof;
(b) 0.1% to 15% by weight a phosphoric acid ester or a salt thereof, wherein the phosphoric acid ester is represented by either or both of the following formulas:

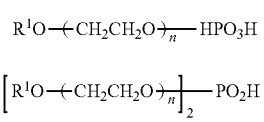

where $R^1$ is $C_6$-$C_{19}$ alkyl, $C_6$-$C_{19}$ alkylphenyl, or tristyrylphenyl; and n is 0 to 20; and
(c) 45% to 90% by weight of water; wherein the composition has a pH of less than 6.

As used herein, the term "alkyl" refers to a linear or branched hydrocarbon radical. Similarly, the term "alkylene" refers to a linear or branched hydrocarbon biradical; and the term "aryl" refers to phenyl or naphthyl.

The term "structural units of a conjugate acid of a secondary or a tertiary amine" refers to the protonated remnant of a secondary or tertiary amine in the polymer. For example, a structural unit of the conjugate acid of bis(2-ethylhexyl)aminoethanol is illustrated as follows:

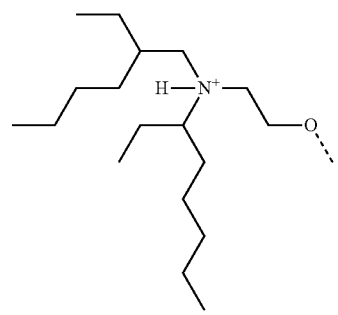

where the dotted line represents the point of attachment of the hydrophobe to the polymer backbone.

The hydrophobically modified alkylene oxide polymer may include a wide variety of linking groups, including 1) polyacetal polyether and polyketal polyether segments formed by the reaction of a polyalkylene glycol with a gem-dihalide such as dibromomethane, dichloromethane, 1,1-dichlorotoluene, 1,1-dichloroethane, and 1,1-dibromomethane; 2) polyaminoplast polyether segments, which are formed from the reaction of a polyalkylene glycol and an aminoplast reagent; 3) polyEPI polyether segments, which arise from the reaction of a polyalkylene glycol and an epihalohydrin or trihaloalkane, where EPI represents the functional group formed by the reaction of an epihalohydrin or a trihaloalkane with an amine, an alcohol, or a mercaptan; and 4) urethane segments, which result from the reaction of a polyalkylene glycol with a diisocyanate.

A particularly preferred hydrophobically modified alkylene oxide polymer is an alkylene oxide urethane polymer, which can be conveniently prepared by contacting together under reactive conditions a) a hydrophobic compound; b) a diisocyanate; and c) a water-soluble polyalkylene glycol (also referred to as a water-soluble polyalkylene oxide).

The diisocyanate starting material is a $C_4$-$C_{20}$ linear, branched, or cycloaliphatic diisocyanate or an aromatic diisocyanate or a combination thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate.

A water-soluble polyalkylene glycol refers to a water-soluble polyethylene glycol, a water-soluble polyethylene glycol/polypropylene glycol copolymer, or a water-soluble polyethylene glycol/poly-n-butylene glycol copolymer. As used herein, the term polypropylene glycol (alternatively, polypropylene oxide) refers to either a polymer having —(OCH$_2$CH$_2$CH$_2$)— or —(OCH(CH$_3$)CH$_2$)— repeating groups or both.

Preferred water-soluble polyalkylene glycols are polyethylene glycols, particularly polyethylene glycols having a weight average molecular weight ($M_w$) in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company or its Affiliates).

The hydrophobic compound comprises a hydrophobic portion and a nucleophilic portion, preferably a nucleophilic portion that is reactive with an isocyanate to make a urethane, a urea, or a thiourea bond. Preferably, the hydrophobic compound is illustrated in Formula III:

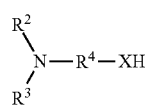

where $R^2$ is $C_1$-$C_{16}$-alkyl, $C_3$-$C_8$-cycloalkyl, $C_6$-$C_{10}$-aryl, or a combination thereof;

$R^3$ is H, $C_1$-$C_{16}$-alkyl, $C_3$-$C_8$-cycloalkyl, $C_6$-$C_{20}$-aryl, or a combination thereof; or $R^2$ and $R^3$, together with the nitrogen atom to which they are attached, form a piperidine or piperazine ring;

$R^4$ is $C_1$-$C_{16}$-alkylene, $C_3$-$C_8$-cycloalkylene, $C_6$-$C_{20}$-arylene, or a combination thereof; wherein $R^2$, $R^3$, and $R^4$ are each optionally substituted with OH, O, S, NH, or N—$C_1$-$C_6$-alkyl, or a combination thereof; and X is O, S, NH, or N—$C_1$-$C_6$-alkyl.

Examples of suitable subclasses of Formula III are represented by Formulas IIIA-IIID:

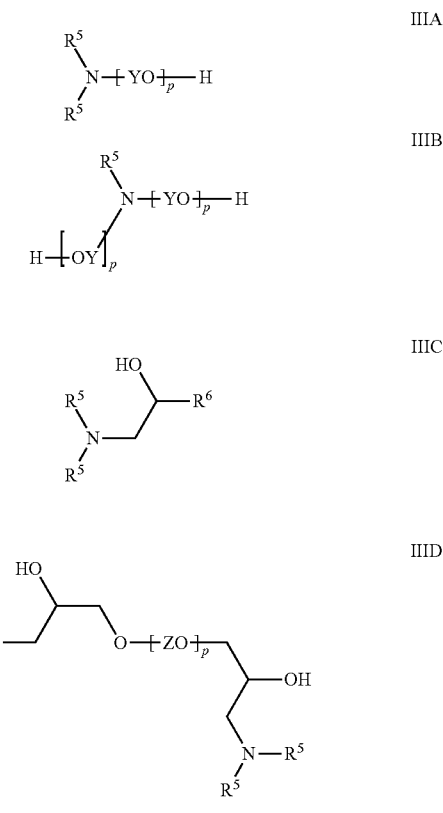

Where each $R^5$ is independently $C_2$-$C_{12}$-alkyl optionally substituted with OH, O, S, or NH, N—$C_1$-$C_6$ or a combination thereof; or benzyl optionally substituted with $C_1$-$C_6$ alkyl; $R^6$ is H, $C_1$-$C_{20}$-alkyl, or CH$_2$—OR$^7$, wherein $R^7$ is H, $C_1$-$C_{20}$-alkyl, phenyl, benzyl, or $C_1$-$C_{20}$-alkylphenyl; each Y is independently $C_3$-$C_8$-alkylene or CH$_2$CHR$^8$, preferably —CH$_2$CH$_2$— or —CH$_2$CH(CH$_3$)—, more preferably —CH$_2$CH$_2$—; where each $R^8$ is independently H, $C_1$-$C_{12}$-alkyl, phenyl, or $C_1$-$C_{12}$-alkylphenyl; each Z is independently $C_1$-$C_{12}$-alkylene, phenylene, or $C_1$-$C_{12}$-alkylphenylene, and each p is independently from 1 to 50.

A preferred subclass of Formula III is Formula IIIE:

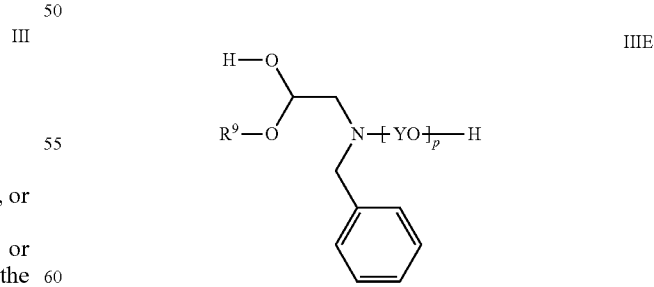

where $R^9$ is $C_3$-$C_{10}$-alkyl, more preferably n-butyl or 2-ethylhexyl; and Y and p are as previously defined. In a preferred embodiment of this subclass, p is 1 and Y is —CH$_2$CH$_2$—.

Another preferred subclass of Formula III is represented by Formula IIIF.

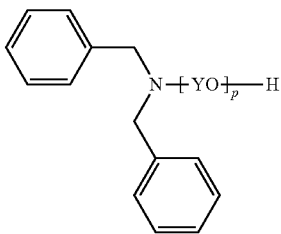

where Y and p are as previously defined.

A more preferred subclass of Formula IIIF is represented by Formula IIIG:

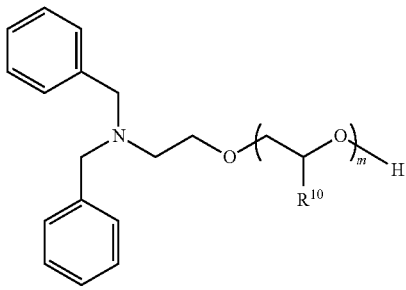

Wherein each $R^{10}$ is independently methyl or ethyl, preferably ethyl; and m is 1 to 10, preferably 3 to 5.

Examples of hydrophobic compounds that can be used to generate secondary amine functionality include N-octylethylenediamine, N-dodecylethylene-diamine, N-octylaminoethanol, N-dodecylaminoethanol, and 2-(2,2,6,6-tetramethyl-4-piperidinyl)ethanol. Hydrophobic groups with secondary amine functionality may also arise from the reaction of a primary amine such as n-octylamine, n-decylamine, or n-dodecylamine, with polyalkylene oxide functionalized with an alkylhalide, an epoxide, or an aminoplast.

Examples of hydrophobic compounds that can be used to generate tertiary amine functionality include 2-(dibutylamino) ethanol, 2-(dioctylamino) ethanol, 2-(diheptylamino) ethanol, 2-(dihexylamino) ethanol, bis-(2-ethylhexylamino) ethanol, 2-(dicocoamino) ethanol, 3-dibutylamino propylamine, dibenzylaminoethanol, N-benzylethanolamine, N-methyl ethanolamine, 1-(dibutylamino)-2-butanol, 2-amino-5-diethylaminopentane, 1-(bis (3-(dimethylamino)propyl)amino)-2-propanol, N-benzyl 3-hydroxypiperidine, diphenylmethyl piperazine, 1-(1-methylpiperazine), 1-(1-phenylpiperazine), 1-(2-aminoethyl)-4-benzyl-piperazine, 4-amino-1-benzyl-piperidine, and 6-dipropylamino-1-hexanol. Alkoxylated analogs of dialkylamine compounds, diarylamine compounds, and dibenzylamine compounds such as bis-(2-ethylhexylamine) alkoxylated with 1 to 100 units of ethylene oxide, propylene oxide, butylene oxide, or mixtures thereof are also suitable reagents.

Preferably, at least 80%, more preferably at last 90%, and most preferably 100% of the hydrophobic portion of the hydrophobically modified alkylene oxide polymer comprises the conjugate acid of the secondary or tertiary amine as described herein.

Preferably, the concentration of the hydrophobically modified alkylene oxide polymer, preferably the hydrophobically modified ethylene oxide urethane polymer, is from 15 to 25 weight percent, based on the weight of the composition.

The composition of the present invention also comprises a phosphoric acid ester, which is represented by either or both of the following formulas:

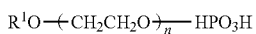

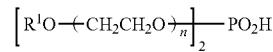

where $R^1$ is preferably $C_6$-$C_{13}$ alkyl, $C_6$-$C_{10}$ alkylphenyl, or tristyrylphenyl; and n is preferably 2 to 16. As used herein, the term alkylphenyl refers to an alkyl group within the stated range (for example, n-hexyl) attached to any position in a phenyl group, which is attached to the oxygen atom, as illustrated:

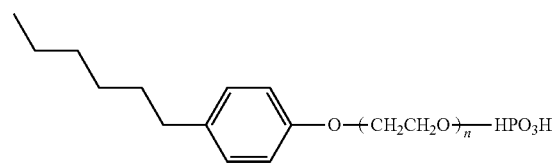

Similarly, tristyrylphenyl refers to the following structure:

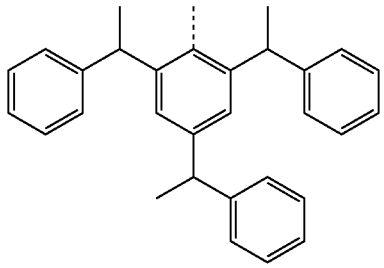

where the dotted line represents a point of attachment to the oxygen atom.

Examples of commercially available phosphoric acid ester surfactants include Ethfac 163 surfactant, Ethfac 161, Ethfac 104, Ethfac 124, and Ethfac 136 surfactants; Rhodafac RS-410, Rhodafac RS-610, and Rhodafac RS-710 surfactants; Dextrol OC-40, Dextrol OC-60, and Dextrol OC-70 surfactants; Strodex SE-100 and Strodex P-100 surfactants; and T-Mulz D6PE surfactant.

Preferably, the preferred concentration of the phosphoric acid ester is from 3, more preferably from 4, to 10, and more preferably to 8 weight percent, based on the weight of the composition. Preferably the pH of the composition is greater than 1.5, more preferably greater than 2; and preferably less than 5, more preferably less than 4, and most preferably less than 3.5.

The composition of the present invention is useful in coating formulations, especially paint formulations, which may include any or all of the following materials: Solvents; fillers; binders; pigments including polymer encapsulated pigments, such as polymer-encapsulated or partially encapsulated opacifying pigment particles including titanium dioxide or zinc oxide; hollow pigments, including pigments having one or more voids; dispersants, such as aminoalcohols and polycarboxylates; other surfactants; other rheology modifiers; defoamers; preservatives, such as biocides, mildewcides, fungicides, algaecides, and combinations thereof; flow agents; leveling agents; and neutralizing agents, such as hydroxides, amines, ammonia, and carbonates.

As the following examples demonstrate, an aqueous solution of the phosphoric acid ester and the hydrophobically modified alkylene oxide polymer is more stable to phase separation than solutions that do not contain the phosphoric acid ester.

EXAMPLES

Weight Average Molecular Weight

The weight average molecular weights ($M_w$) of the HEURs were determined using size exclusion chromatography (SEC). The separations were carried out at room temperature on a liquid chromatograph consisting of an Agilent 1100 Model isocratic pump and autoinjector (Waldbronn, Germany), and a Polymer Laboratories ELS-1000 Model evaporative light scattering detector (Polymer Laboratories, International, Ltd., Church Stretton, UK). The detector was operated with a 140° C. nebulizer, a 180° C. evaporator, and a 1.5 $L^2$/min gas flow rate. System control, data acquisition, and data processing were performed using version 3.0 of Cirrus software (Polymer Laboratories, Church Stretton, UK). Samples were prepared in N,N-dimethylacetamide (DMAc, HPLC grade) at concentrations of 2 mg/mL, shaken for 6 h at 80° C., and filtered using 0.45 μm polytetrafluoroethylene (PTFE) filter. The separations were performed in DMAc (HPLC grade) at 0.5 mL/min using three PLgel™ columns (300×7.5 mm ID) packed with polystyrene-divinylbenzene gel (pore size marked as 100 Å, $10^3$ Å and $10^4$ Å, particle size 5 μm) purchased from Polymer Laboratories (Church Stretton, UK). The injection volume was 100 μL of sample solution at a concentration of 2 mg/mL. The molar mass characteristics of the analyzed samples were calculated based on polyethylene glycol/oxide (PEG/PEO) standards also purchased from Polymer Laboratories (Church Stretton, UK).

Intermediate Example 1

CARBOWAX™ PEG 8000 (4000 g) was melted and added to a batch melt reactor heated to 85° C. Hexamethylene diisocyanate (HDI, 403 g) was added followed by 10 min of stirring. Bismuth octoate solution (28% aqueous, 12 g) was then added to the reactor and the resulting mixture was stirred for 30 min. MPEG 2000 Methoxy Polyethylene Glycol (390 g) and Bis(2-ethylhexyl)aminoethanol (581 g) was added followed by 20 min of stirring. The resulting molten polymer was removed from the reactor and cooled.

Intermediate Example 2

Intermediate Example 2 was prepared substantially according to the procedure of Intermediate Example 1 using the following starting materials and quantities: PEG 8000 Polyethylene Glycol (1720.4 g); isophorone diisocyanate (IPDI, 73.3 g); bis(2-ethylhexyl)aminoethanol (77.1 g); and bismuth octoate solution (28% aqueous, 4.3 g).

Intermediate Example 3

Intermediate Example 3 was prepared substantially according to the procedure of Intermediate Example 1 using the following starting materials and quantities: PEG 8000 Polyethylene Glycol (1723.2 g); IPDI (59.0 g); 3-[bis(2-ethylhexyl)amino]-1,2-propanediol (29.5 g); and bismuth octoate solution (28% aqueous, 4.3 g).

Preparation of Thickener Solution Examples

Thickener solutions were prepared by cutting the polymer from the Intermediate Examples into small pieces (<1 g), weighing the desired amount of these small pieces into a container and adding water containing an appropriate amount of biocide, phosphoric acid ester surfactant, and other additives as indicated to the container. The contents were gently agitated at room temperature (typically 16-24 h) to dissolve or disperse the polymer wax into the aqueous solution.

Once homogeneous, the samples were equilibrated in a 25° C. water bath just prior to measuring pH and viscosity on a Brookfield DV-II+LV viscometer. Aqueous sample pH values were measured on a Corning pH Meter Model 430 (Corning Incorporated, Corning, N.Y., USA). The pH meter was calibrated with pH=7.0 and pH=4.0 buffer solutions from Fisher Scientific (Fair Lawn, N.J., USA).

Examples 1-3

Aqueous Compositions of Intermediate Example 1 and Phosphoric Acid Ester Surfactant Solutions of Intermediate Example 1 (Examples 1-3) were prepared with 20 weight % of the polymer in the solution and from 4.5 to 6 weight percent of the Rhodafac RS-610 surfactant. A control solution (not containing a phosphoric acid ester surfactant) was prepared using malic acid. The pH, viscosity and initial appearance of these solutions were determined at the time they were prepared. The samples were then heat aged at 50° C. for 3 weeks and examined for phase separation. As Table 1 shows, the solutions for the examples of the present invention remained clear and had viscosities below 3000 cps, while the solution for Comparative Example 1(C1) showed phase separation. The term "meq" refers to milliequivalents of acid per 100 g of associative thickener solution. Weight percentages (%) and milliequivalents of RS-610 and malic acid are shown side-by-side in the same column.

TABLE 1

Heat-Age Phase Stability Measurements

| Ex. No. | RS-610 (%, meq) | Malic acid (%; meq) | pH | Viscosity (cps) | Initial appearance | Heat Aged Phase Stability at 3 wks |
|---|---|---|---|---|---|---|
| C1 | | 3.5; 52 | 2.6 | 300 | Off white thin suspension | Separated |
| 1 | 4.5; 6.5 | | 2.86 | 2749 | Clear solution | No phase separation |
| 2 | 5%; 7.2 | | 2.84 | 2369 | Clear solution | No phase separation |
| 3 | 6%; 8.6 | | 2.67 | 1960 | Clear solution | No phase separation |

Comparison solutions of Intermediate Examples 2 and 3 (C1 and C2) were prepared using a Acumer 9932 polymeric acrylic acid in place of a phosphorus acid ester surfactant to suppress the viscosity of the HEUR.

Pourable aqueous solutions containing Intermediate Examples 2 and 3 and Rhodafac RS-610 surfactant (Examples 4-9) as well as pourable aqueous solutions containing Intermediate Examples 2 and 3 and Acumer 9932 polyacrylic acid (Comparative Examples 2 and 3) were prepared. As Table 2 illustrates, the solutions prepared using Rhodafac RS-610 had a higher clarity at the time of preparation, indicating better phase stability, than solutions prepared using Acumer 9932. During room temperature aging for 30 days, the solution of Comparative Example 2 separated while solutions of Examples 4 to 6 remained clear.

TABLE 2

Heat-Age Phase Stability Measurements of HEURS w/Phosphorus Acid Ester Surfactant or Polyacrylic Acid Surfactant

| Ex. No. | Int. Ex. 2 | Int. Ex. 3 | 9932 (%; meq) | RS-610 (%; meq) | pH | Clarity observations |
|---|---|---|---|---|---|---|
| C2 | 25% | 0 | 2; 27 |  | 3.90 | Very cloudy solution |
| 4 | 25% | 0 | 0 | 2.5; 3.6 | 3.21 | Clear solution |
| 5 | 25% | 0 | 0 | 4.0; 5.8 | 2.58 | Clear solution |
| 6 | 25% | 0 | 0 | 5.5; 7.9 | 2.33 | Clear solution |
| C3 |  | 16% | 2; 27 |  | 3.35 | Hazy solution |
| 7 |  | 16% | 0 | 0.6; 0.9 | 3.3 | Clear solution |
| 8 |  | 16% | 0 | 1.6; 2.3 | 2.43 | Clear solution |
| 9 |  | 16% | 0 | 2.6; 3.7 | 2.25 | Clear solution |

Thickener Performance

The performance obtained by the use of associative thickeners comprising hydrophobic groups that comprise partially or wholly protonated secondary or tertiary amine functionality is demonstrated in a latex paint composition. A latex paint composition, Pre-paint #1, was prepared by combining the following components and amounts:

TABLE 3

Pre-paint 1 Components

| Component | Amount |
|---|---|
| Kronos 4311 titanium dioxide slurry | 263.4 g |
| Water | 150.4 g |
| Ethylene glycol | 24.3 g |
| ROPAQUE ™ Ultra Opaque Polymer | 49.8 g |
| RHOPLEX ™ SG-30 Binder | 421.8 g |
| Drewplus L-475 defoamer | 4.0 g |
| Texanol coalescent | 19.2 g |
| Triton X-405 surfactant | 2.5 g |
| ACRYSOL ™ RM-2020NPR Rheology Modifier | 30.0 g |
| Total | 963.5 g |

ACRYSOL and RHOPLEX are Trademarks of The Dow Chemical Company or Its Affiliates.

The formulated paint was obtained by adding thickener and water to a portion of sample of Pre-paint #1 (191.78 g). To maintain constant solids of the fully formulated paint, the combined weight of added thickeners and water was adjusted to 15.95 g. The pH values of the fully formulated paints were in the range of 8.5 to 9.0.

Formulated paints were made by adding the desired amount of aqueous thickener dispersion and water to the prepaint solution with stirring, then additional stirring for 10 min after completion of the addition. In Table 4, thickener concentrations in the paint are reported as dry grams of thickener added even though the aqueous thickener composition was admixed with the paint. For example, a concentration of 3 dry grams of a thickener can be obtained in the paint by adding 15 g of 20% solids thickener dispersion. Following equilibration at room temperature for 24 h, the thickened paint was stirred to achieve a uniform mixture before viscosity values were measured.

KU (Krebs unit) viscosities were measured using a Brookfield Krebs Unit Viscometer KU-1+ available from Brookfield Engineering Labs (Middleboro, Mass., USA). ICI viscosities (in poise) were measured on a viscometer manufactured by Research Equipment London, Ltd. (London, UK).

As Table 4 illustrates, thickener performance of a paint using the thickener of Example 1 was comparable to the performance of the paint using comparative Example 1 inasmuch as both exhibit a high degree of thickening efficiency in Table 4.

TABLE 4

Thickener Performance in Paint

| Thickener | Thickener Solution (g) | KU | ICI (poise) | Brookfield (#3, 6 rpm) |
|---|---|---|---|---|
| C1 | 3.5 | 105 | 1.0 | 79900 |
| 1 | 3.5 | 110 | 0.95 | 71200 |

Accordingly, the phosphoric acid ester surfactant used to promote phase stability does not adversely affect the performance of the subsequently prepared paint.

The invention claimed is:

1. A composition comprising, based on the weight of the composition: (a) 10% to 40% by weight of a water soluble hydrophobically modified alkylene oxide polymer having a hydrophobic portion, at least 50% by weight of the hydrophobic portion comprises structural units of a conjugate acid of a secondary or a tertiary amine substituted with $C_6$-$C_{36}$-alkyl, $C_3$-$C_8$ cycloalkyl, $C_6$-$C_{20}$-aryl, or a combination thereof, which hydrophobic portion is optionally functionalized with O, OH, NH, or N—$C_1$-$C_6$-alkyl, or a combination thereof;

(b) 0.1% to 15% by weight a phosphoric acid ester or a salt thereof, wherein the phosphoric acid ester is represented by either or both of the following formulas:

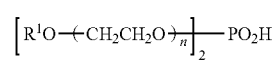

where $R^1$ is $C_6$-$C_{19}$ alkyl, $C_6$-$C_{19}$ alkylphenyl, or tristyrylphenyl; and n is 0 to 20; and (c) 45% to 90% by weight of water; wherein the composition has a pH of less than 6.

2. The composition of claim 1 wherein at least 80% by weight of the hydrophobic portion of the hydrophobically modified alkylene oxide polymer comprises the conjugate acid of the secondary or tertiary amine, which secondary or tertiary amine is represented by the following structure:

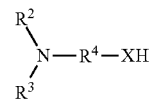

where $R^2$ is $C_1$-$C_{16}$-alkyl, $C_3$-$C_8$-cycloalkyl, $C_6$-$C_{10}$-aryl, or a combination thereof;

$R^3$ is H, $C_1$-$C_{16}$-alkyl, $C_3$-$C_8$-cycloalkyl, $C_6$-$C_{20}$-aryl, or a combination thereof; or $R^2$ and $R^3$, together with the nitrogen atom to which they are attached, form a piperidine or piperazine ring;

R⁴ is $C_1$-$C_{16}$-alkylene, $C_3$-$C_8$-cycloalkylene, $C_6$-$C_{20}$-arylene, or a combination thereof; wherein $R^2$, $R^3$, and $R^4$ are each optionally substituted with OH, O, S, NH, or N—$C_1$-$C_6$-alkyl, or a combination thereof; and X is O, S, NH, or N—$C_1$-$C_6$-alkyl.

3. The composition of claim 1 wherein at least 90% by weight of the hydrophobic portion of the hydrophobically modified alkylene oxide polymer comprises the conjugate acid of the secondary or tertiary amine, which is represented by any of the following structures:

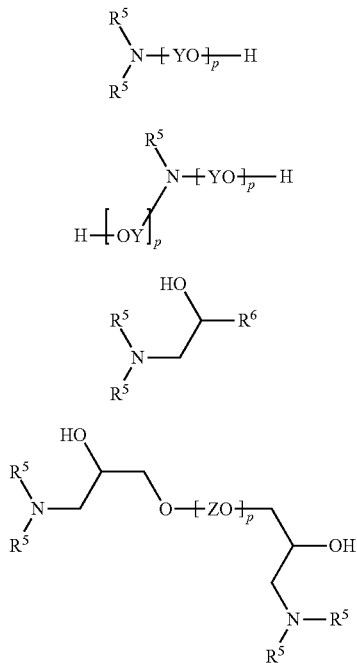

where each $R^5$ is independently $C_2$-$C_{12}$-alkyl optionally substituted with OH, O, S, NH, N—$C_1$-$C_6$ or a combination thereof; or benzyl optionally substituted with $C_1$-$C_6$ alkyl;

$R^6$ is H, $C_1$-$C_{20}$-alkyl, or $CH_2$—$OR^7$, wherein $R^7$ is H, $C_1$-$C_{20}$-alkyl, phenyl, benzyl, or $C_1$-$C_{20}$-alkylphenyl;

each Y is independently $C_3$-$C_8$-alkylene or $CH_2CHR^8$; where each $R^8$ is independently H, $C_1$-$C_{12}$-alkyl, phenyl, or $C_1$-$C_{12}$-alkylphenyl;

each Z is independently $C_1$-$C_{12}$-alkylene, phenylene, or $C_1$-$C_{12}$-alkylphenylene;

and each p is independently from 1 to 20.

4. The composition of claim 3 wherein the water soluble hydrophobically modified alkylene oxide polymer comprises from 15 to 25 weight percent of the composition, and the phosphoric acid ester comprises from 3 to 10 weight percent of the composition.

5. The composition of claim 4 wherein the water soluble hydrophobically modified alkylene oxide polymer is a hydrophobically modified ethylene oxide urethane polymer.

6. The composition of claim 5 wherein $R^1$ is $C_6$-$C_{13}$ alkyl or $C_6$-$C_{10}$ alkylphenyl; n is 2 to 16; and the phosphoric acid ester comprises from 4 to 8 weight percent of the composition.

7. The composition of claim 6 wherein the pH of the composition is greater than 1.5 and less than 4.

8. The composition claim 7 wherein the pH of the composition is greater than 2 and less than 3.5.

9. The composition of claim 1 which further includes at least one additional component selected from the group consisting of binders; pigments; defoamers; preservatives; and coalescents.

\* \* \* \* \*